March 15, 1927. 1,621,171
J. J. LIBI
ELECTRIC HEATER AND STOVE
Filed July 8, 1924
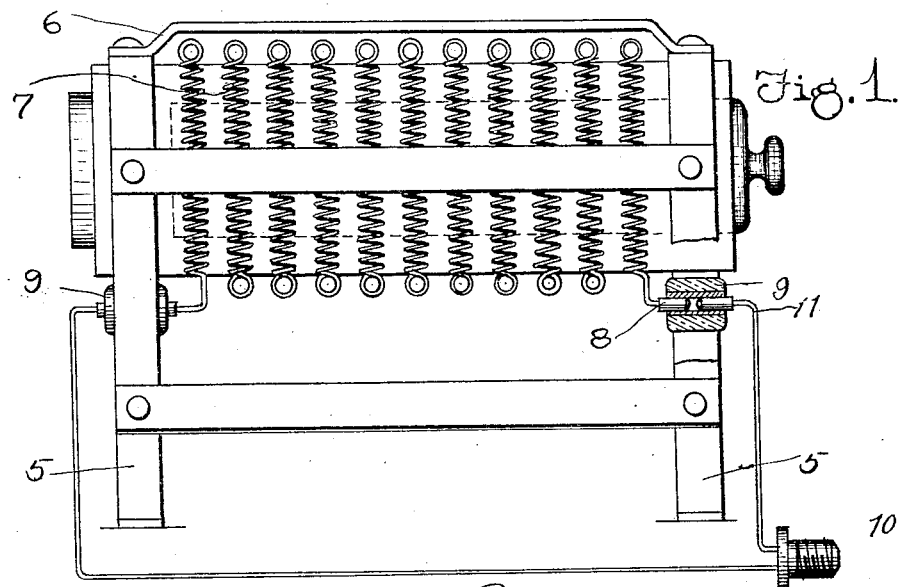
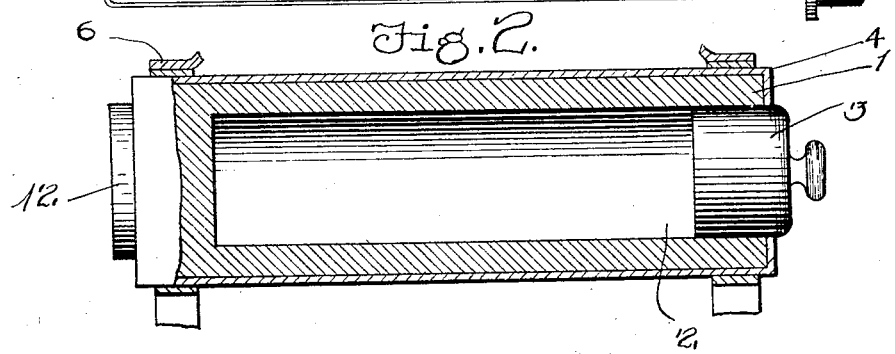
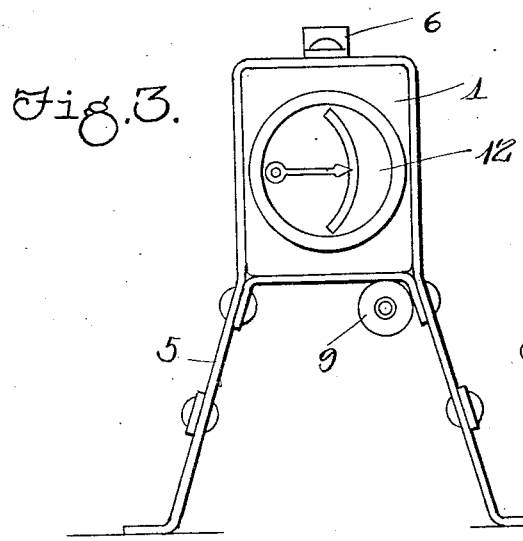
Inventor
John J. Libi.
by
M. K. Saunders
Attorney Patented Mar. 15, 1927.

1,621,171

UNITED STATES PATENT OFFICE.

JOHN J. LIBI, OF SAN FRANCISCO, CALIFORNIA.

ELECTRIC HEATER AND STOVE.

Application filed July 8, 1924. Serial No. 724,873.

My invention relates to a combined electric heater and stove and the object of my invention is to provide an electric heater and stove of simple construction so that it may be manufactured at a minimum of expense, but which will be efficient in operation.

A further object of my invention is the provision of an electric stove which will readily cook small portions of food with a small amount of current and which will retain the heat therein for a considerable period of time after the current has been turned off.

Another object of my invention is the provision of an electric heater and stove that may be readily attached to and detached from the usual electric socket installed in dwellings.

I attain the above and other objects of the invention, which will be apparent as the description proceeds, by means of the construction shown in the accompanying drawings in which—

Figure 1 is a side elevation of my improved heater and stove;

Figure 2 is a view, partly in section, of the stove element thereof; and

Figure 3 is an end elevation of my improved device.

In the drawings, in which like reference characters indicate like parts on all the figures thereof, 1 indicates the stove element, which is here shown in the form of a brick hollowed out to provide a cavity 2 in the interior thereof extending from an opening in one end thereof substantially through its entire length. A closure 3 for the opening in the end wall of the stove element is provided whereby access to the interior of the cavity may be had. The element 1 is provided with a coating 4 of any suitable material, for example, plaster of Paris.

The stove element 1 is mounted on supports 5, these support being extended around the sides and top of the element and to the extensions are attached guard members 6 for a purpose which will be hereinafter set forth. The supports and guard members are formed of metal and may be covered with heat insulating material, or they may be painted.

Wound several times around the stove element is a spiral conducting wire 7 of suitable resistance, the ends of said wire terminating in plugs 8 which are adapted to be inserted in one end of suitable cooperating sockets 9. The outer wall of each of the sockets 9 is a non-conductor, such as a porcelain tube, which is here shown as attached to one of the supports 5.

The means for connecting my improved device to a source of electric current is here shown as comprising a plug 10 adapted to fit into the electric socket usually found in dwellings; to the plug 10 are attached two conductors having plugs 11 at the ends thereof. The plugs 11 are adapted to fit into the sockets 9 in order to make electrical contact with the plugs 8 which constitute the terminals of the wire heating element 7.

In the end of the stove element 1, opposite the end closure, is located a thermometer 12.

When it is desired to use my improved device as a means for cooking small portions of food, it is only necessary to wrap the food in a piece of waxed paper, place it in the cavity and connect the plug 10 with the source of current supply. The heating element 7, surrounding the stove member 1, heats the member uniformly on all sides, so that an even heating and cooking of the article contained in the cavity is the result. This cooking operation is particularly desirable in the case of baking bananas, since one at a time can be prepared without the consumption of a large amount of current.

In addition to its use as a stove, my improved device also functions as a heater, since it is composed of material, such as brick or soapstone, that retains heat which it will continue to give out for a considerable period of time after the current has been turned off.

It is obvious that a continuous cover may be substituted for the guard members 6, if desired, in which case the cover should be of heat conducting material so that an article placed on the upper surface thereof may be heated. Upon the top guard members, or the continuous cover, a cooking vessel may be supported and articles of food or liquids placed therein.

It is apparent also that any other well known means may be substituted for that here shown for connecting the heating wire element 7 to the source of current supply, the one illustrated being merely diagrammatic of a suitable construction.

Having thus described my invention, what I claim and desire to secure by Letters Patent is:

A cooker of the class described, consisting of a cooking chamber formed of heat retaining material, a wire of high resistance spirally wound upon itself to form a coil of many turns, said wire coil being formed in a plurality of loops and surrounding said chamber, said wire being free from said chamber, and a metal frame forming a combined guard and stand for the cooking chamber, said frame being formed with sockets for detachably connecting the terminals of said resistance element with a source of current supply.

In testimony whereof I affix my signature.

JOHN J. LIBI.